(12) United States Patent
Vivekanandan et al.

(10) Patent No.: US 11,582,261 B2
(45) Date of Patent: Feb. 14, 2023

(54) CLOUD ACCESS SECURITY BROKER SYSTEMS AND METHODS VIA A DISTRIBUTED WORKER POOL

(71) Applicant: Zscaler, Inc., San Jose, CA (US)

(72) Inventors: Shankar Vivekanandan, Alpharetta, GA (US); Narinder Paul, Sunnyvale, CA (US); Parth Shah, Santa Clara, CA (US); Pratibha Nayak, Bengaluru (IN); Sonal Choudhary, Alpharetta, GA (US); Huan Chen, Alpharetta, GA (US)

(73) Assignee: Zscaler, Inc., San Jose, CA (US)

( * ) Notice: Subject to any disclaimer, the term of this patent is extended or adjusted under 35 U.S.C. 154(b) by 152 days.

(21) Appl. No.: 16/833,830

(22) Filed: Mar. 30, 2020

(65) Prior Publication Data
US 2021/0258348 A1 Aug. 19, 2021

(51) Int. Cl.
*H04L 29/06* (2006.01)
*H04L 9/40* (2022.01)

(52) U.S. Cl.
CPC .......... *H04L 63/20* (2013.01); *H04L 63/0209* (2013.01); *H04L 63/101* (2013.01)

(58) Field of Classification Search
CPC ... H04L 63/20; H04L 63/0209; H04L 63/101; H04L 63/123; H04L 63/145; H04L 63/14
USPC .......................................................... 726/1
See application file for complete search history.

(56) References Cited

U.S. PATENT DOCUMENTS

| | | | |
|---|---|---|---|
| 8,185,510 B2 | 5/2012 | Chaudhry et al. | |
| 8,429,111 B1 | 4/2013 | Kailash et al. | |
| 8,869,259 B1 | 10/2014 | Udupa et al. | |
| 8,887,249 B1 | 11/2014 | Schekochikhin et al. | |
| 9,092,502 B1* | 7/2015 | Cannaliato | G06F 16/245 |
| 9,152,789 B2 | 10/2015 | Natarajan et al. | |
| 9,154,475 B1 | 10/2015 | Kailash et al. | |
| 9,473,537 B2 | 10/2016 | Sinha et al. | |
| 9,609,015 B2 | 3/2017 | Natarajan et al. | |
| 10,523,710 B2 | 12/2019 | Sinha et al. | |
| 10,715,540 B2* | 7/2020 | Viktorov | H04L 63/20 |
| 10,983,843 B2* | 4/2021 | Duggal | G06F 9/544 |
| 2010/0211924 A1* | 8/2010 | Begel | G06F 16/9024 717/101 |
| 2020/0242269 A1* | 7/2020 | Narayanaswamy | G06F 21/552 |

* cited by examiner

*Primary Examiner* — Longbit Chai
(74) *Attorney, Agent, or Firm* — Clements Bernard Baratta; Lawrence A. Baratta, Jr.

(57) ABSTRACT

A Cloud Access Security Broker (CASB) system includes a controller; a message broker connected to the controller; and a plurality of workers connected to the message broker and connected to one or more cloud providers having a plurality of files contained therein for one or more tenants, wherein the plurality of workers are configured to crawl through the plurality of files for the one or more tenants, based on policy and configuration for the one or more tenants provided via the controller, and based on assignments from the message broker. The plurality of workers can be further configured to cause an action in the one or more cloud providers based on the crawl and based on the policy and the configuration. The action can include any of allowing a file, deleting a file, quarantining a file, and providing a notification.

16 Claims, 7 Drawing Sheets

CLOUD ACCESS SECURITY BROKER SYSTEMS AND METHODS VIA A DISTRIBUTED WORKER POOL

FIELD OF THE DISCLOSURE

The present disclosure relates generally to networking and computing. More particularly, the present disclosure relates to Cloud Access Security Broker (CASB) systems and methods via a distributed worker pool.

BACKGROUND OF THE DISCLOSURE

A Cloud Access Security Broker (CASB) is an on-premises system or cloud-based service between cloud service users and cloud applications. The CASB is configured to monitor activity and enforce security policies, such as monitoring user activity, warning administrators about potentially hazardous actions, Data Leakage Prevention (DLP), enforcing security policy compliance, automatically preventing malware, etc. For example, a CASB system, either on-premises or as a cloud-based service, can scan through a large number of files in a cloud application, e.g., Office 365, Dropbox, Box, Google Drive, Salesforce, etc. Also, enterprises are moving their Information Technology (IT) infrastructure to the cloud. This places tremendous loads on traditional CASB systems, resulting in latency, inability to properly scan all files, poor user experience, etc.

There is a need to introduce efficiencies into traditional CASB systems to enable large-scale deployments in the cloud.

BRIEF SUMMARY OF THE DISCLOSURE

The present disclosure relates to Cloud Access Security Broker (CASB) systems and methods. In particular, the present disclosure describes an efficient CASB system that can perform distributed file crawling for a tenant (organization) to scan files for associated policies, take actions based on the associated policies, provide reports/control, and integrate with cloud-based security systems. The objective is to provide a tenant's IT administration control of files and other content stored in cloud applications. The present disclosure is agnostic with respect to a cloud application, operating with various different cloud applications based on Application Programming Interfaces (APIs). The present disclosure includes a so-called "assembly line" approach where various workers operate in parallel to efficiently process content through various queues, including various hand-offs. The CASB system described herein does not store customer data permanently, nor does it store confidential credentials, and the CASB system supports enormous scale (e.g., billions of files or more) along with a configured throttle rate by the cloud applications.

In an embodiment, a Cloud Access Security Broker (CASB) system includes a controller; a message broker connected to the controller; and a plurality of workers connected to the message broker and connected to one or more cloud providers having a plurality of files contained therein for one or more tenants, wherein the plurality of workers are configured to crawl through the plurality of files for the one or more tenants, based on policy and configuration for the one or more tenants provided via the controller, and based on assignments from the message broker. The plurality of workers can be further configured to cause an action in the one or more cloud providers based on the crawl and based on the policy and the configuration. The action can include any of allowing a file, deleting a file, quarantining a file, and providing a notification. The CASB system can further include a Data Leakage Prevention (DLP) engine configured to scan the plurality of files based on the policy and the configuration, and to provide an action based on the scan. The CASB system can further include a sandbox configured to execute a file of the plurality of files, and provide an action based on the execution and based on the policy and the configuration. The CASB system can further include a plurality of queues that include files from the plurality of files for analysis by workers of the plurality of workers. The plurality of workers can include a plurality of types of workers, each being configured to perform a specific task in the CASB system. The CASB system can further include a connection between the controller and a cloud-based security system, wherein the cloud-based security system is configured to analyze files of the plurality of files and provide an action. A first crawl for each tenant can include all files and subsequent crawls performed periodically crawl incrementally. The controller can include a regulator that monitors the performance of all the workers and performs control based thereon.

In a further embodiment, a method and a non-transitory computer-readable storage medium having computer-readable code stored thereon for programming a processor to perform steps is described. The steps include, in a Cloud Access Security Broker (CASB) system having a message broker connected to a controller, and a plurality of workers connected to the message broker and connected to one or more cloud providers having a plurality of files contained therein for one or more tenants, obtaining policy and configuration for the one or more tenants provided via the controller; providing assignments from the message broker to the plurality of workers; and crawling through the plurality of files for the one or more tenants, based on the policy and the configuration, and based on the assignments from the message broker. The plurality of workers can be further configured to cause an action in the one or more cloud providers based on the crawl and based on the policy and the configuration. The action can include any of allowing a file, deleting a file, quarantining a file, and providing a notification. The steps can further include scanning the plurality of files based on the policy and the configuration for Data Leakage Prevention (DLP); and providing an action based on the scanning. The steps can further include executing a file of the plurality of files in a sandbox; and providing an action based on the execution and based on the policy and the configuration. The steps can further include utilizing a plurality of queues that include files from the plurality of files for analysis by workers of the plurality of workers. The plurality of workers can include a plurality of types of workers, each being configured to perform a specific task in the CASB system. A first crawl for each tenant can include all files and subsequent crawls performed periodically crawl incrementally.

BRIEF DESCRIPTION OF THE DRAWINGS

The present disclosure is illustrated and described herein with reference to the various drawings, in which like reference numbers are used to denote like system components/method steps, as appropriate, and in which:

FIG. 2 is a block diagram of a server which may be used in the cloud-based system of FIG. 1 or the like;

FIG. 3 is a block diagram of a mobile device which may be used in the cloud-based system of FIG. 1 or the like;

DETAILED DESCRIPTION OF THE DISCLOSURE

Again, the present disclosure relates to Cloud Access Security Broker (CASB) systems and methods. In particular, the present disclosure describes an efficient CASB system that can perform distributed file crawling for a tenant (organization) to scan files for associated policies, take actions based on the associated policies, provide reports/control, and integrate with cloud-based security systems. The objective is to provide a tenant's IT administration control of files and other content stored in cloud applications. The present disclosure is agnostic with respect to a cloud application, operating with various different cloud applications based on Application Programming Interfaces (APIs). The present disclosure includes a so-called "assembly line" approach where various workers operate in parallel to efficiently process content through various queues, including various hand-offs. The CASB system described herein does not store customer data permanently, nor does it store confidential credentials, and the CASB system supports enormous scale (e.g., billions of files or more) along with a configured throttle rate by the cloud applications.

Example Cloud System Architecture

Figure 1:
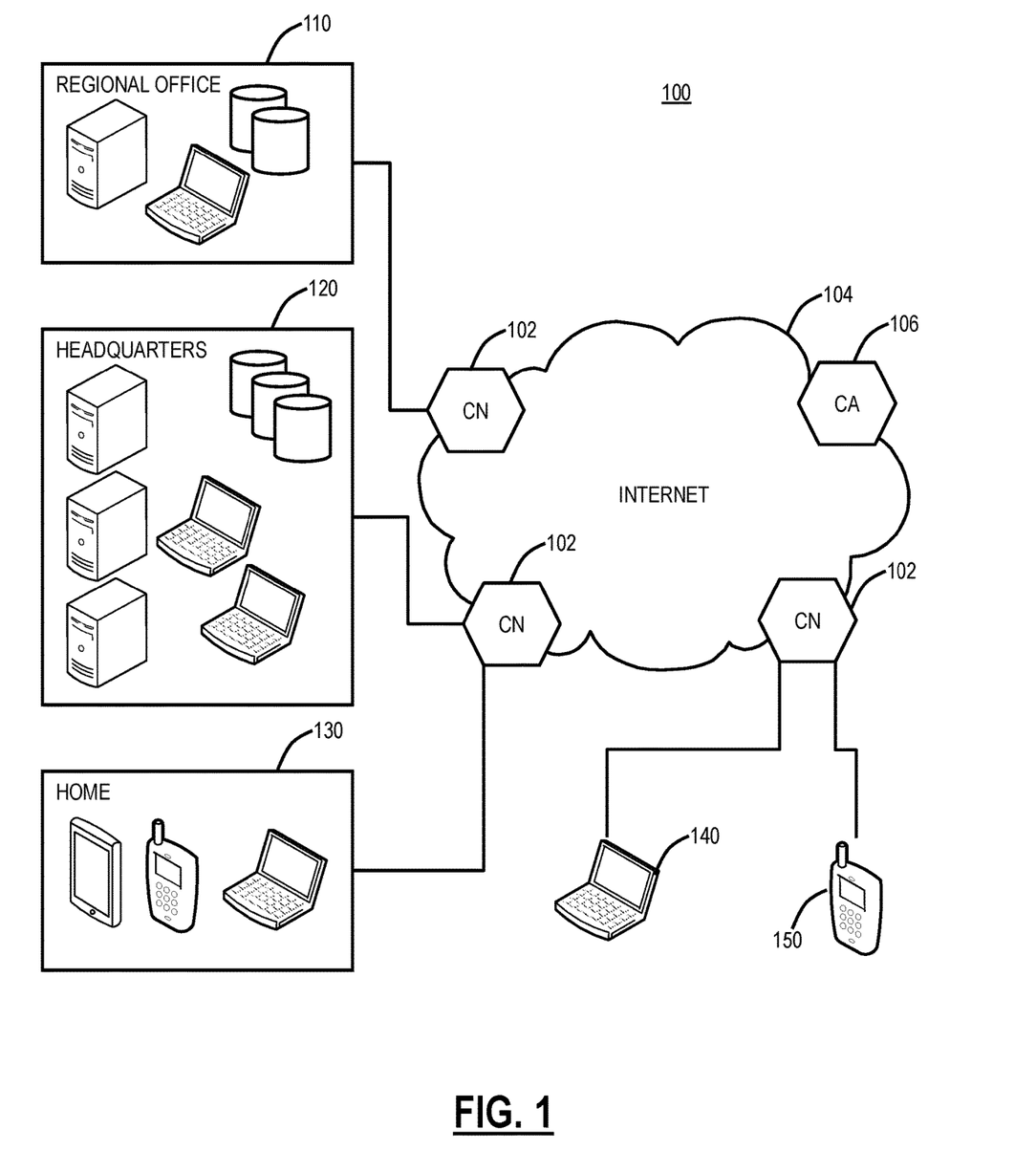
FIG. 1 is a network diagram of a cloud-based system for implementing various cloud-based service functions.
Figure 2:
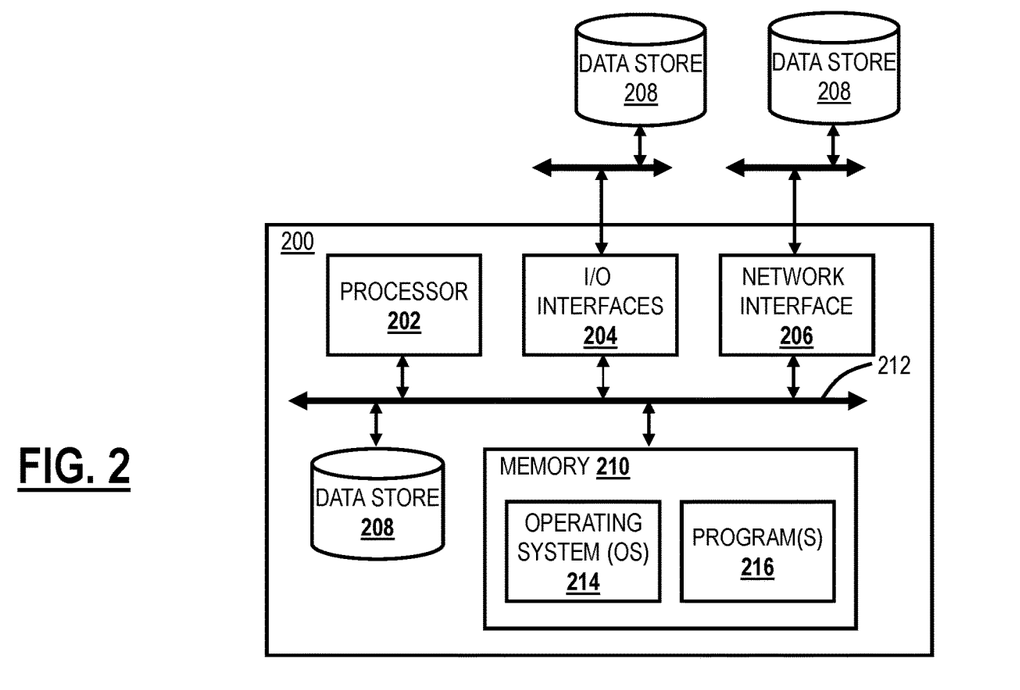

FIG. 1 is a network diagram of a cloud-based system 100 for implementing various cloud-based service functions. The cloud-based system 100 includes one or more Cloud Nodes (CN) 102 communicatively coupled to the Internet 104 or the like. The cloud nodes 102 may be implemented as a server 200 (as illustrated in FIG. 2) or the like and can be geographically diverse from one another, such as located at various data centers around the country or globe. Further, the cloud-based system 100 can include one or more Central Authority (CA) nodes 106, which similarly can be implemented as the server 200 and be connected to the cloud nodes 102.

For illustration purposes, the cloud-based system 100 can include a regional office 110, headquarters 120, various employee's homes 130, laptops/desktops 140, and mobile devices 150, each of which can be communicatively coupled to one of the cloud nodes 102. These locations 110, 120, 130, and devices 140, 150 are shown for illustrative purposes, and those skilled in the art will recognize there are various access scenarios to the cloud-based system 100, all of which are contemplated herein. The devices 140, 150 can be so-called road warriors, i.e., users off-site, on-the-road, etc. The cloud-based system 100 can be a private cloud, a public cloud, a combination of a private cloud and a public cloud, or the like.

Again, the cloud-based system 100 can provide any functionality through services such as software as a service, platform as a service, infrastructure as a service, security as a service, Virtual Network Functions (VNFs) in a Network Functions Virtualization (NFV) Infrastructure (NFVI), etc. to the locations 110, 120, 130 and devices 140, 150. The cloud-based system 100 is replacing the conventional deployment model where network devices are physically managed and cabled together in sequence to deliver the various services associated with the network devices. The cloud-based system 100 can be used to implement these services in the cloud without end-users requiring the physical devices and management thereof. The cloud-based system 100 can provide services via VNFs (e.g., firewalls, Deep Packet Inspection (DPI), Network Address Translation (NAT), etc.). VNFs take the responsibility of handling specific network functions that run on one or more virtual machines (VMs), software containers, etc., on top of the hardware networking infrastructure—routers, switches, etc. Individual VNFs can be connected or combined together as building blocks in a service chain to offer a full-scale networking communication service. The cloud-based system 100 can provide other services in addition to VNFs, such as X-as-a-Service (XaaS), where X is security, access, etc.

Cloud computing systems and methods abstract away physical servers, storage, networking, etc. and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "software as a service" (SaaS) is sometimes used to describe application programs offered through cloud computing. A common shorthand for a provided cloud computing service (or even an aggregation of all existing cloud services) is "the cloud." The cloud-based system 100 is illustrated herein as one example embodiment of a cloud-based system, and those of ordinary skill in the art will recognize the systems and methods described herein contemplate operation with any cloud-based system.

In an embodiment, the cloud-based system 100 can be a distributed security system or the like. Here, in the cloud-based system 100, traffic from various locations (and various devices located therein) such as the regional office 110, the headquarters 120, various employee's homes 130, laptops/desktops 140, and mobile devices 150 can be monitored or redirected to the cloud through the cloud nodes 102. That is, each of the locations 110, 120, 130, 140, 150 is communicatively coupled to the Internet 104 and can be monitored by the cloud nodes 102. The cloud-based system 100 may be configured to perform various functions such as spam filtering, uniform resource locator (URL) filtering, antivirus protection, bandwidth control, DLP, zero-day vulnerability protection, web 2.0 features, and the like. In an embodiment, the cloud-based system 100 may be viewed as Security-as-a-Service through the cloud, such as the IA. For example, the cloud-based system 100 can be used to block or allow access to web sites, and such access control can be based in part on the web crawler systems and methods described herein to identify malicious sites.

Figure 3:
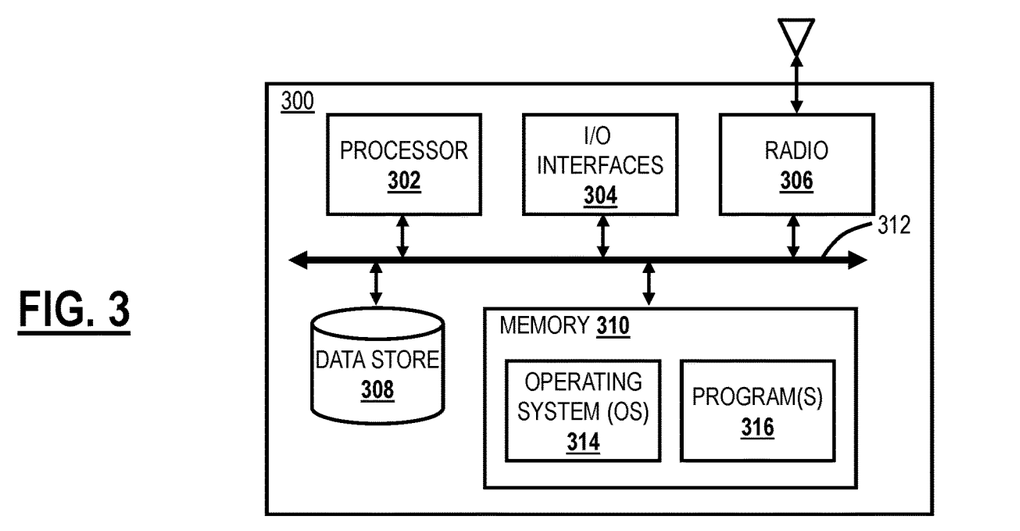

In an embodiment, the cloud-based system 100 can be configured to provide device security and policy systems and methods. The laptops/desktops 140, the mobile device 150, as well as various devices at the locations 110, 120, 130 may be a user device 300 (as illustrated in FIG. 3) and may include common devices such as laptops, smartphones, tablets, netbooks, personal digital assistants, MP3 players, cell phones, e-book readers, Internet of Things (IoT) devices, and the like. The cloud-based system 100 can be configured to provide security and policy enforcement for devices. Advantageously, the cloud-based system 100, when operating as a distributed security system, avoids platform-specific security apps on the mobile devices 150, forwards web traffic through the cloud-based system 100, enables network administrators to define policies in the cloud, and enforces/cleans traffic in the cloud prior to delivery to the mobile devices 150. Further, through the cloud-based system 100, network administrators may define user-centric policies tied to users, not devices, with the policies being applied regardless of the device used by the user. The cloud-based system 100 provides 24×7 security with no need for updates as the cloud-based system 100 is always up to date with current threats and without requiring device signature updates. Also, the cloud-based system 100 enables multiple enforcement points, centralized provisioning, and logging, automatic traffic routing to the nearest cloud node 102, the geographical distribution of the cloud nodes 102, policy shadowing of users, which is dynamically available at the cloud nodes 102, etc.

The cloud nodes 102 can proactively detect and preclude the distribution of security threats, e.g., malware, spyware, viruses, email spam, Data Leakage Prevention (DLP), content filtering, etc., and other undesirable content sent from or requested by the user device 200. The cloud nodes 102 can also log activity and enforce policies, including logging changes to the various components and settings. The cloud nodes 102 can be communicatively coupled to the user devices 300, providing in-line monitoring. The connectivity between the cloud nodes 102 and the user devices 300 may be via a tunnel (e.g., using various tunneling protocols such as Generic Routing Encapsulation (GRE), Layer Two Tunneling Protocol (L2TP), or other Internet Protocol (IP) security protocols may be used. Alternatively, the connectivity may be via a user application on the user device 300 that is configured to forward traffic through the cloud nodes 102. The central authority nodes 106 can store policy data for each organization and can distribute the policy data to each of the cloud nodes 102. The central authority nodes 106 can also distribute threat data that includes the classifications of content items according to threat classifications, e.g., a list of known viruses, a list of known malware sites, spam email domains, a list of known phishing sites, a DLP dictionary, etc.

As described herein, the terms cloud services and cloud applications may be used interchangeably. A cloud service is any service made available to users on-demand via the Internet, such as via the cloud-based system 100 as opposed to being provided from a company's own on-premises servers. A cloud application, or cloud app, is a software program where cloud-based and local components work together.

Two example cloud services include Zscaler Internet Access (ZIA) and Zscaler Private Access (ZPA), from Zscaler, Inc. (the assignee and applicant of the present application). The ZIA service can include firewall, threat prevention, Deep Packet Inspection (DPI), Data Leakage Prevention (DLP), and the like. The XPA can include access control, microservice segmentation, etc. For example, the ZIA service can provide a user with Internet Access, and the ZPA service can provide a user with access to enterprise resources in lieu of traditional Virtual Private Networks (VPNs).

Other cloud services can include Office 365, Dropbox, Box, Google Drive, Salesforce, and the like. In the context of these services, a provider of such cloud services can be referred to as a cloud provider, a SaaS provider, etc., and may utilize a hardware architecture similar to the cloud-based system 100. Of course, other types of cloud architectures are also contemplated.

Example Server Architecture

FIG. 2 is a block diagram of a server 200, which may be used in the cloud-based system 100, in other systems, or standalone. For example, the cloud nodes 102 and the central authority nodes 106 may be formed as one or more of the servers 200. The server 200 may be a digital computer that, in terms of hardware architecture, generally includes a processor 202, Input/Output (I/O) interfaces 204, a network interface 206, a data store 208, and memory 210. It should be appreciated by those of ordinary skill in the art that FIG. 2 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104. The network interface 206 may include, for example, an Ethernet card or adapter (e.g., 10BaseT, Fast Ethernet, Gigabit Ethernet, 10 GbE) or a Wireless Local Area Network (WLAN) card or adapter (e.g., 802.11a/b/g/n/ac). The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Example User Device Architecture

FIG. 3 is a block diagram of a user device 300, which may be used in the cloud-based system 100 or the like. Again, the user device 300 can be a smartphone, a tablet, a smartwatch, an Internet of Things (IoT) device, a laptop, etc. The user device 300 can be a digital device that, in terms of hardware architecture, generally includes a processor 302, I/O interfaces 304, a radio 306, a data store 308, and memory 310. It should be appreciated by those of ordinary skill in the art that FIG. 3 depicts the user device 300 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a CPU, an auxiliary processor among several processors associated with the user device 300, a semiconductor-based microprocessor (in the form of a microchip or chipset), or generally any device for executing software instructions. When the user device 300 is in operation, the processor 302 is configured to execute software stored within the memory 310, to communicate data to and from the memory 310, and to generally control operations of the user device 300 pursuant to the software instructions. In an embodiment, the processor 302 may include a mobile optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, a barcode scanner, and the like. System output can be provided via a display device such as a Liquid Crystal Display (LCD), touch screen, and the like.

The radio 306 enables wireless communication to an external access device or network. Any number of suitable wireless data communication protocols, techniques, or methodologies can be supported by the radio 306, including any protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 can include one or more software programs, each of which includes an ordered listing of executable instructions for implementing logical functions. In the example of FIG. 3, the software in the memory 310 includes a suitable operating system 314 and programs 316. The operating system 314 essentially controls the execution of other computer programs and provides scheduling, input-output control, file and data management, memory management, and communication control and related services. The programs 316 may include various applications, add-ons, etc. configured to provide end user functionality with the user device 300. For example, example programs 316 may include, but not limited to, a web browser, social networking applications, streaming media applications, games, mapping and location applications, electronic mail applications, financial applications, and the like. In a typical example, the end-user typically uses one or more of the programs 316 along with a network such as the cloud-based system 100.

CASB System

Figure 4:
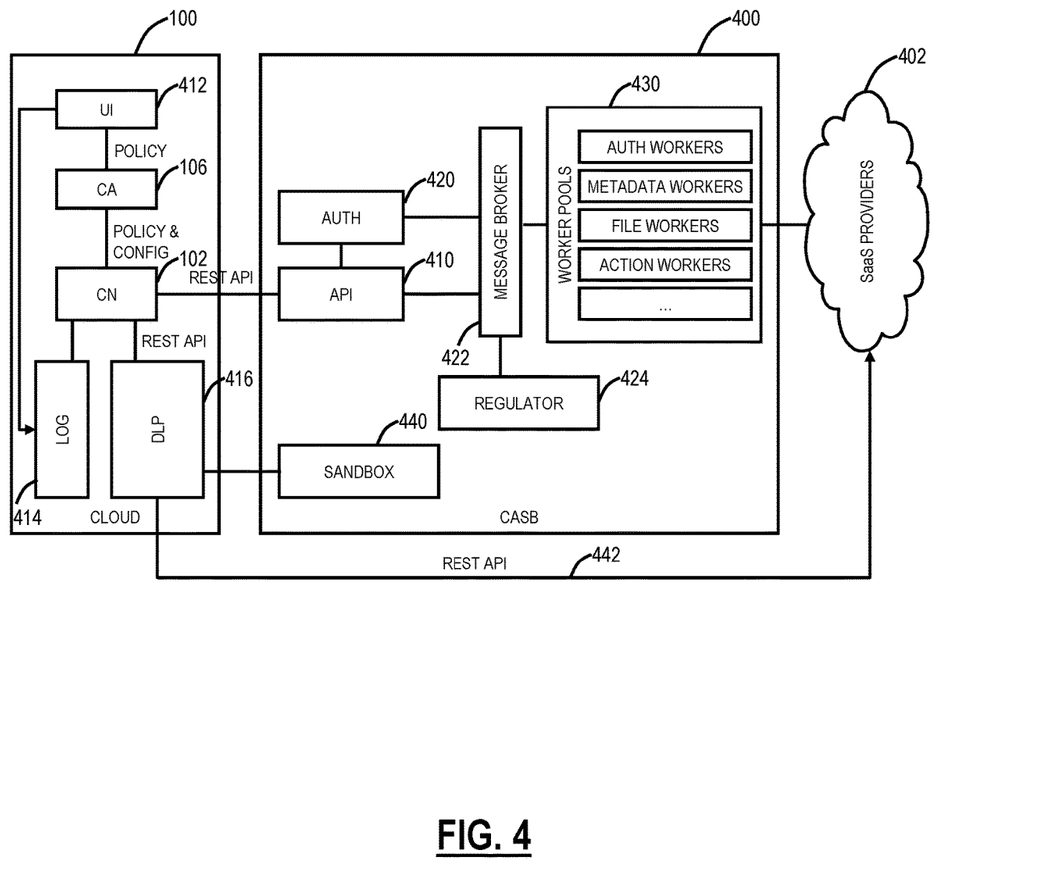
FIG. 4 is a network diagram of a CASB system.

FIG. 4 is a network diagram of a CASB system 400. The CASB system 400 can be located between the cloud-based system 100 and one or more SaaS providers 402. As described herein, the SaaS providers 402 can be referred to as cloud providers, cloud service providers, service providers, etc. Examples of the providers 402 include, without limitation, Office 365, Dropbox, Box, Google Drive, Salesforce, etc. That is the providers 402 can provide cloud services for enterprises related to file sharing, document management, email, collaboration, scheduling, timekeeping, financial, etc. The key point is the enterprise IT is moving from local applications hosted and maintained within the enterprise network to cloud-based solutions where the data is located off-site, in the providers 402.

The CASB system 400 can be implemented in a cloud-based system, such as using the architecture of the cloud-based system 100. The CASB system 400 can be implemented in a private cloud, a public cloud, or a hybrid cloud. Alternatively, the CASB system 400 can be one or more servers 200 that can be located on-premises with an enterprise, off-premises, etc. Even further, the CASB system 400 can be collocated with the SaaS providers 402. That is, various architecture implementations are contemplated. Further, the CASB system 400 contemplated both operations with the cloud-based system 100, operating as a distributed security system, as well as independent operation (i.e., with the components of the cloud-based system 100 omitted in FIG. 4, and with the functionality incorporated in the CASB system 400 itself).

The objective of the CASB system 400 is to provide enterprise IT control over data (resources) in the SaaS providers 402. Note, as described herein, the enterprise can be referred to as a tenant of the provider 402. The CASB system 400 is configured to operate as a distributed file crawler for files associated with a particular tenant. The CASB system 400 can both provide a report based on the file crawling as well as implement policy actions based on policy configuration.

The CASB system 400 includes one or more APIs 410, such as a Representational state transfer (REST) API. In an embodiment, the APIs 410 connect to the cloud-based system 100, such as one of the cloud nodes 102. Here, a user can interact with the CASB system 400 via a User Interface (UI) 412 through a central authority node 106. Additionally, the cloud node 102 can connect to a log 414, such as a data store that stores statistics and transactions, for reporting. The cloud node 102 can also connect to a DLP engine 416 for data leakage protection through the CASB system 400. Here, the CASB 400 can be used to identify content, files, etc. that match sensitive data in a DLP dictionary. The user can provide policy and configuration via the UI 412.

Again, the CASB system 400 can be deployed without the cloud-based system 100. Here, the API 410 can connect directly to the UI 412, and the log 414 and the DLP engine 416 can be incorporated directly in the CASB system 400, or in an external system.

The CASB system 400 includes an authentication provider 420 that is configured to perform authentication of the tenant with the SaaS providers 402. The APIs 410 and the authentication provider 420 connect to a message broker 422, which is configured to interact between the APIs 410, the authentication provider 420, and a plurality of workers 430. A regulator 424 is connected to the message broker. The message broker 422 is a pipeline where job tickets are queued for consumption by the workers 430.

In an embodiment, the authentication provider 420, a controller for the APIs 410, the regulator 424, and the workers 430 are Java Spring services, and other embodiments are also contemplated. The message broker 422 can be a queuing service, such as using Apache Kafka, Microsoft EventHub, or other embodiments. The API controller is a liaison service that interfaces between the CASB system 400 and the cloud-based system 100.

With respect to the authentication provider 420, customer information, including tokens and credentials are not stored permanently or persisted. Also, the CASB system 400 is not tied specifically to a particular SaaS provider 402. That is, the CASB system 400 is configured to operate with multiple, different SaaS providers 402. This is accomplished through customized APIs and configured of the workers 430. Each SaaS provider 402 can have a different set of APIs and functionality.

The workers 430 are connected to the SaaS providers 402 and are dedicated to performing particular tasks. In a sense, the plurality of workers 430 are organized in a pool of workers, and tasks are assigned between the workers 430. The CASB 400 can include a sandbox 440 that can be connected to the DLP engine 416, and the DLP engine 416 can also include a REST API 445 connection to the SaaS providers 402. Note, the sandbox 440 can be included in the CASB system 400, or it can be an external system. The sandbox 440 is configured to execute files, open files, etc. in a safe environment to analyze whether the files are malicious or not.

The worker pool is a collection of workers 430 that interact with the SaaS provider 402 and perform specific tasks. The pool of workers 430 enables the CASB system 400 to operate efficiently in a distributed nature. The workers 430 are assigned tasks from various queues, via the message broker 422 and the regulator 424. Thus, the workers 430 can operate akin to an assembly line, and there can be handoffs between workers 430. For example, the workers 430 can include authentication workers to authenticate users, tenants, etc., metadata workers to analyze file or content metadata, file workers to scan/analyze files, action workers to perform various policy-related actions, and the like.

The workers 430 can logically be viewed as contract workers in a factory, on an assembly line, etc. The workers 430 are provided specific instructions in a job ticket. The job ticket has information on what job to be performed, where to get the inputs, and where to send the outputs. Every worker 430 also knows what to do when something goes wrong.

The regulator 424 is like the SCADA (Supervisory Control and Data Acquisition) in a control system architecture. The regulator 424 monitors the performance of all the workers 430 and controls the overall system for optimum throughput.

Job Ticket Example

Again, the message broker 422 assigns jobs to the workers 430. Here is an example of a job ticket for an example job:

{
TenantID: 123456
TransactionID: 111111
JobType: GetTenantUsers
Run ID: 1
SaaSProvider: Google Drive
. . .
. . .
. . .
}

Design Constraints

Again, each different SaaS provider 402 can have a different set of APIs and functionality. The CASB system 400 is configured to interface with a plurality of different SaaS providers 402. The log 414 can be configured to store changes/events for an entire organization, including on a per user basis.

The APIs between the CASB 400 and the SaaS providers 402 may be limited, e.g., throttled by the SaaS providers 402. As such, there is an initial baseline crawl (i.e., a first-run) where the CASB system 400 has to crawl and scan all files in the SaaS provider 402. This initial baseline crawl is performed efficiently and is synchronized with the DLP engine 416. After the baseline crawl, subsequent crawls are performed incrementally, namely through files that changed since the previous crawl. For example, the first run can be referred to as run one, and each incremental crawl is run X, which only scans and crawls files that have changed since run X−1. In an embodiment, the period of incremental calls is once a day. Of course, other periods are also contemplated.

File Crawl

The SaaS providers 402 generally provide two ways to crawl through the files for a tenant, namely crawling based on organization-wide file activity or a change log and crawling based on a pseudo-breadth-first traversal. The file activity or a change log enables crawling based on file changes. The pseudo-breadth-first traversal is crawling based on snapshots.

Figure 5:
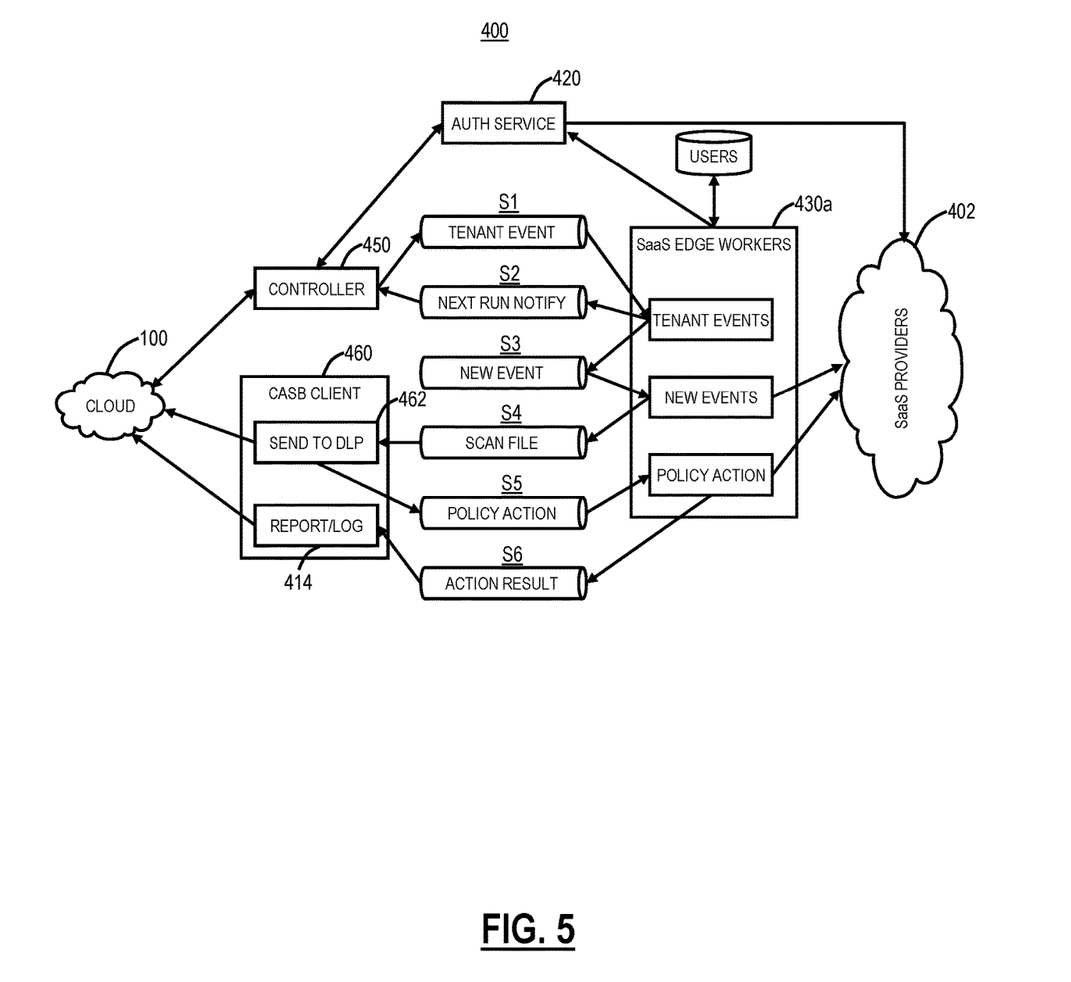
FIG. 5 is a functional block diagram of filing crawling of the SaaS provider with the CASB system.

FIG. 5 is a functional block diagram of filing crawling of the SaaS provider 402 with the CASB system 400. Specifically, FIG. 5 illustrates functionality associated with file crawling in the SaaS provider 402 by the CASB 400. The CASB 400 includes a controller 450, such as the message broker 422 and the regulator 424. The controller 450 can communicate with the cloud-based system 100 and the authentication provider 420. The authentication provider 420 can communicate with the SaaS providers 402. The CASB 400 can also include a CASB client 460 that includes a worker for DLP 462 and the log 414. In the example of FIG. 5, there are edge workers 430a that interface between the authentication provider 420, the SaaS provider 402, the controller 450, and the CASB client 460. The objective of the edge workers 430a is to perform file crawling of the SaaS providers 402. In an embodiment, the SaaS providers 402 can be file storage providers, such as, for example, Office 365 (SharePoint), Box, DropBox, etc.

For illustration, an example operation is described in FIG. 5. There is a tenant event (S1) from the controller 450 to the edge worker 430a. The next run notification (S2) is provided from the edge worker 430a after all files are crawled in the run. The edge worker 430a notes a new event (S3) with file meta-data, the edge worker 430a fetches file details and provides file for scanning (S4) which is sent to DLP 562 for scanning and analysis. A policy action (S5) can be the result of the DLP 562 and provided to the edge worker 430a. The edge worker 430a can implement the policy action in the SaaS provider 402 and provide the result (S6) for the log 414. For example, a policy action can be to delete a file, quarantine a file, flag a file, etc.

Crawling Based on a Change Log

Figure 6:
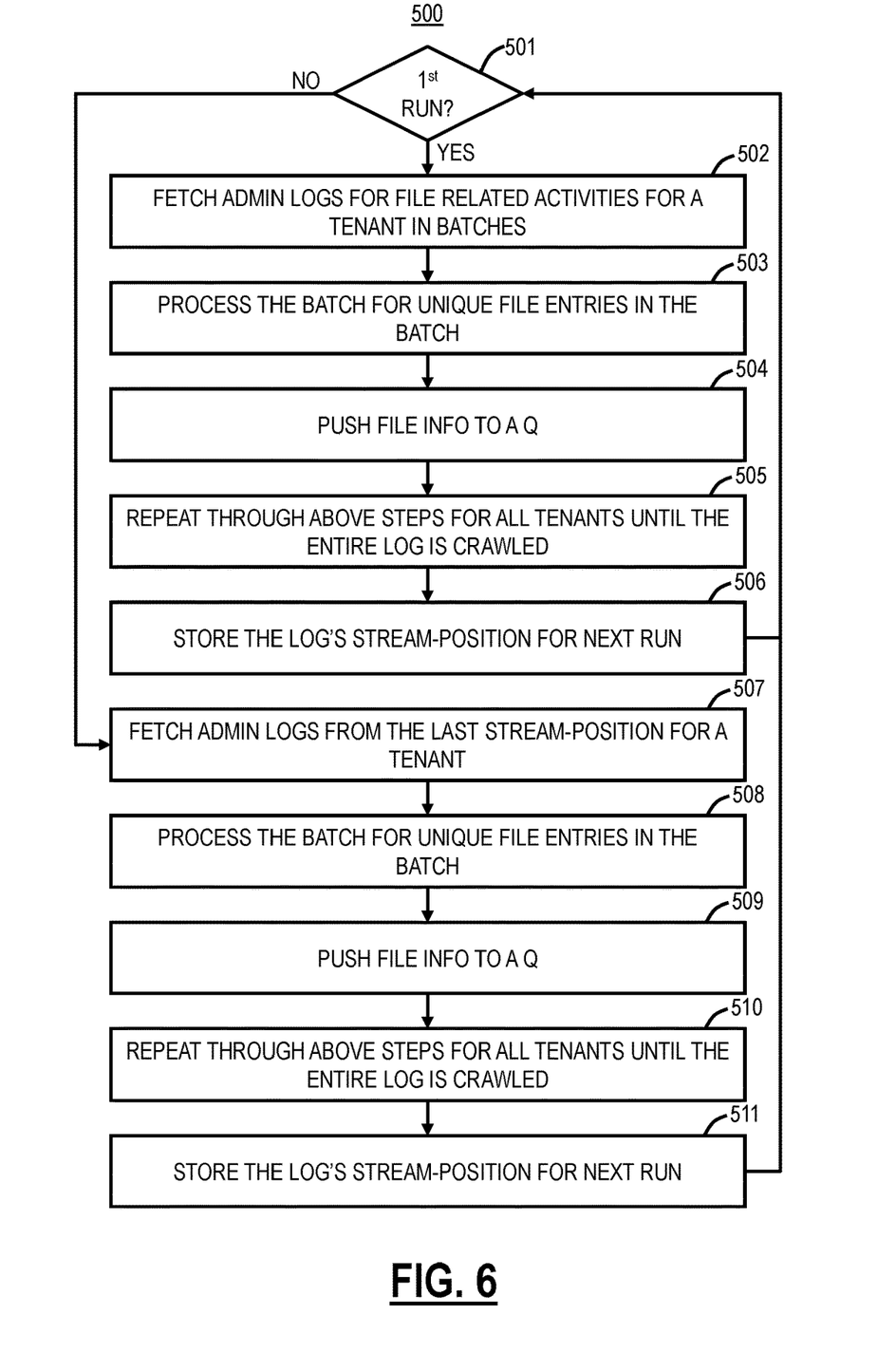
FIG. 6 is a flowchart of a file crawling process based on a change log.

FIG. 6 is a flowchart of a file crawling process 500 based on a change log. The file crawling process 500 contemplates implementation by the CASB system 400 to crawl the SaaS provider 402. The file crawling process 500 includes, for a first run (step 501), fetching admin logs for file-related activities for a tenant in batches (step 502), processing the batch for unique file entries in the batch (step 503), pushing the file info into a queue (Q) (step 504), repeating steps 503, 504 until the entire log is crawled (step 505), and storing the log's stream-position for a next Run (step 506).

For a run X (step 501) where X is an integer greater than 1, the file crawling process 500 includes, fetching admin logs from the last stream-position for a tenant (step 507), processing the batch for unique file entries in the batch (step 508), pushing file info to a queue (Q) (step 509), repeating through above steps 508, 509 for all tenants until the entire log is crawled (step 510), and storing the log's stream-position for a next Run (step 511).

Crawling Based on the Breadth-First Traversal

Figure 7:
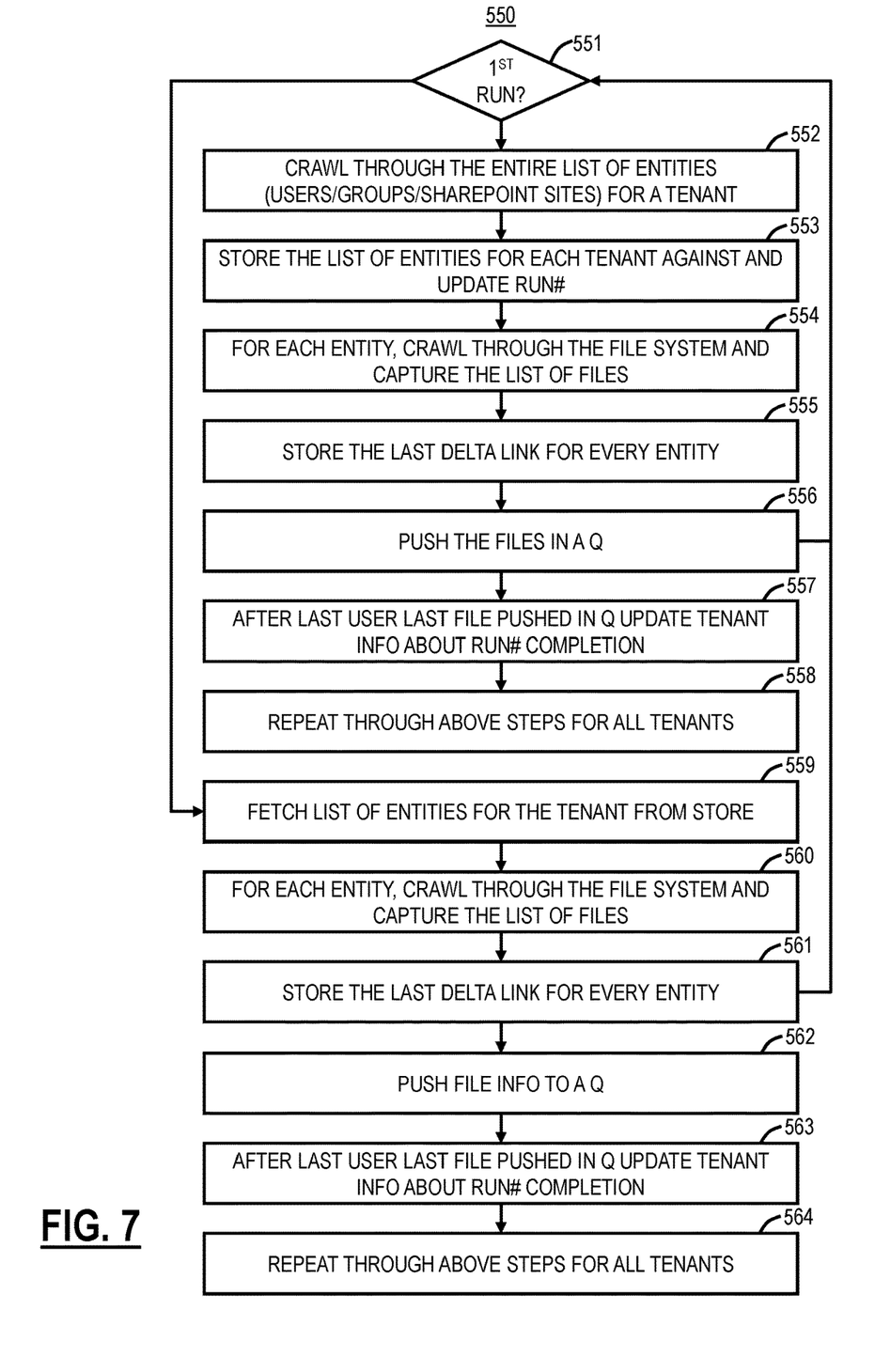
FIG. 7 is a flowchart of a file crawling process based on breadth-first traversal.

FIG. 7 is a flowchart of a file crawling process 550 based on breadth-first traversal. The file crawling process 550 contemplates implementation by the CASB system 400 to crawl the SaaS provider 402. For example, some SaaS providers 402 may not maintain a change log for a tenant, but instead, provide a snapshot of a user's filesystem and then a change log for every user. The file crawling process 500 includes, for a first run (step 551), crawling through the entire list of entities (Users/Groups/SharePoint Sites) for a tenant (step 552), and storing the list of entities for each tenant against and update Run # (step 553). For each entity, the file crawling process 550 includes, crawling through the File System and capturing the list of files (step 554), storing the last delta link for every entity (step 555), and pushing the files in a queue (Q) (step 556). The file crawling process 550 includes, after the last user, the last file pushed in the queue (Q), updating tenant info about Run # completion (step 557), and repeating through the above steps for all tenants (step 558).

For run X (step 551) where X is an integer greater than 1, the file crawling process 550 includes fetching a list of entities for the tenant from store (step 559), for each entity, crawling through the File System and capture the list of files (step 560), storing the last delta link for every entity (step 561), pushing the files in a queue (Q) (step 562), after last user last file pushed in the queue (Q), updating tenant info about Run # completion (step 563), and repeating through above steps for all tenants (step 564).

Flow Diagram

Figure 8:
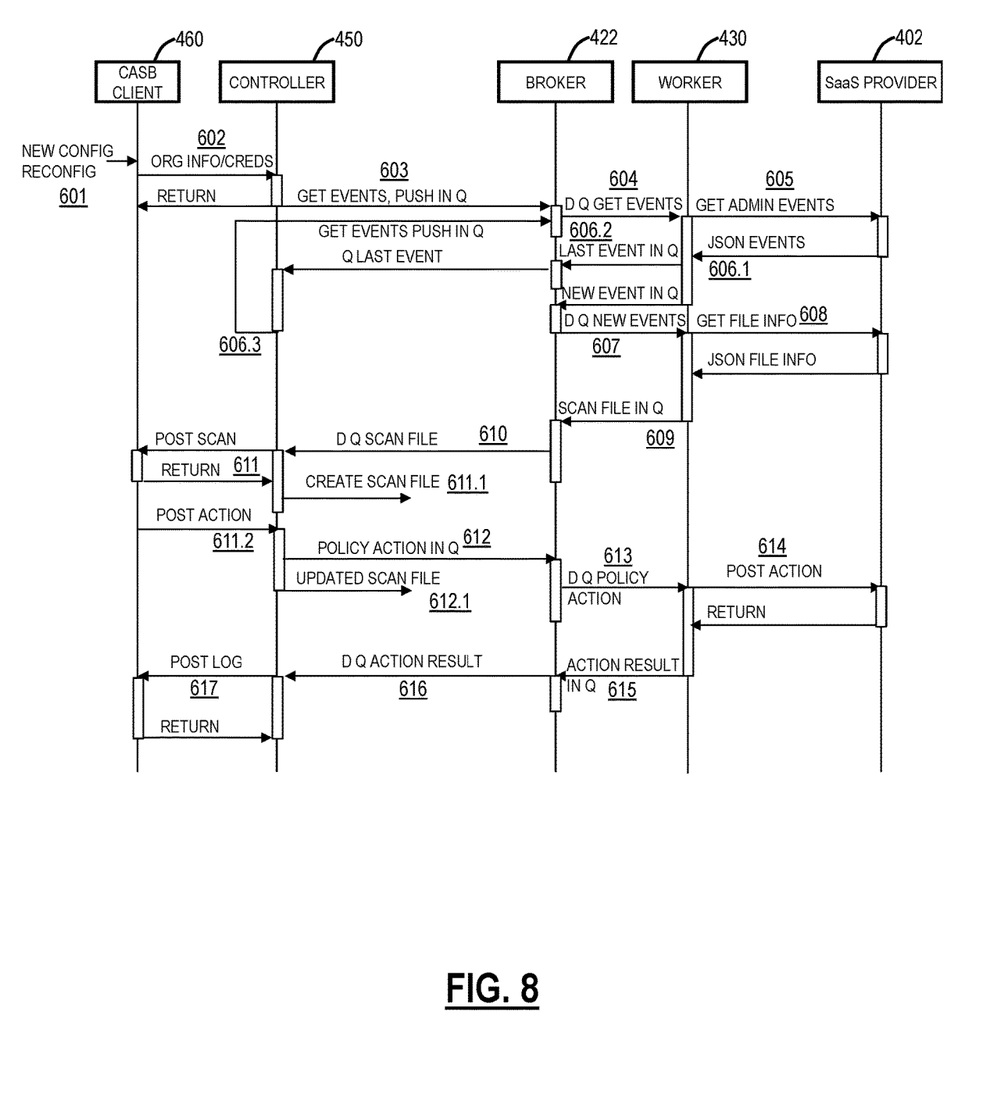
FIG. 8 is a flow diagram of example operations between the CASB client, the controller, the message broker, a worker, and the SaaS provider.

FIG. 8 is a flow diagram of example operations between the CASB client 460, the controller 450, the message broker 422, a worker 430, and the SaaS provider 402. A new configuration or reconfiguration is provided, via the CASB client 460, the cloud-based system 100, etc. (step 601), and organization (tenant) information and credentials are provided to the controller 450 (step 602). The controller 450 gets events and pushes them in a queue (Q) (step 422). The message broker 422 is configured to dequeue (D Q) the events and assign it to the worker 430 (step 604). The worker 430 is configured to interact with the SaaS provider 402 to get admin events (step 605), which are provided as JavaScript Object Notation (JSON) events (step 606.1). The process is continued until the queue is emptied, the last event in the queue (step 606.2, 606.3).

The worker 430 can add new events in the queue, and the broker 422 can dequeue the new events when assigning back to a worker 430 (step 607). The worker 430 gets file info (step 608) and receives JSON file info from the SaaS provider 402. The worker 430 can scan each file in the queue (step 609), provide results to the controller 450, which dequeues the scanned file (step 610).

The controller 450 can provide results of the scan to the CASB client 460, which returns information (step 611). The controller 450 can create a scan file (step 611.1) and receive a post-action (step 611.2) from the CASB client 460. For example, the CASB client 460 may perform DLP, and the action can be allow, delete, quarantine, etc. The controller 450 can implement the policy action in the queue (step 612), the brokers 422 can dequeue the policy action (step 613) and assign the action to the worker 430 which posts the action in the SaaS provider (step 614). The worker 450 can provide the action result in a queue (step 615), the broker 422 can dequeue the action results (step 616) and post the action result in the log (step 617).

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A Cloud Access Security Broker (CASB) system comprising:
   a controller;
   a message broker connected to the controller;
   an authentication provider configured to perform authentication of one or more tenants;
   a plurality of workers connected to the message broker and connected to one or more cloud providers having a plurality of files contained therein for the one or more tenants, and
   a plurality of queues configured to store files from the plurality of files for analysis by workers of the plurality of workers based on assignments from the message broker,
   wherein the controller is configured to crawl through the plurality of files for the one or more tenants, based on policy and configuration for the one or more tenants and push a file from the plurality of files into one of the plurality of queues responsive to the file being one of a unique file entry or a new event, and wherein a first crawl includes,
   fetching Information Technology (IT) admin change logs for file-related activities for a tenant in batches, processing the batch for unique file entries in the batch, pushing the file info into a queue, repeating until the entire IT log is crawled, and storing the log's stream-position for a next crawl, wherein IT admin change logs include statistics and transactions, and
   responsive to an IT admin change log not being accessible, crawling through the entire list of entities for a tenant, storing the list of entities for each tenant, storing a last change for each entity, updating tenant info, and repeating for all tenants,
   wherein the first crawl is synchronized with Data Leakage Prevention (DLP) scan frequency and subsequent crawls performed periodically crawl incrementally.

2. The CASB system of claim 1, wherein one of the plurality of workers are further configured to cause an action of one of the files in the plurality of queues responsive to the provided assignments.

3. The CASB system of claim 2, wherein the action includes any of allowing a file, deleting a file, quarantining a file, and providing a notification.

4. The CASB system of claim 1, further comprising a Data Leakage Prevention (DLP) engine configured to scan the plurality of files based on the policy and the configuration, and to provide an action based on the scan.

5. The CASB system of claim 1, further comprising a sandbox configured to execute a file of the plurality of files, and provide an action based on the execution and based on the policy and the configuration.

6. The CASB system of claim 1, wherein the plurality of workers include a plurality of types of workers, each being configured to perform a specific task in the CASB system.

7. The CASB system of claim 1, further comprising a connection between the controller and a cloud-based security system, wherein the cloud-based security system is configured to analyze files of the plurality of files and provide an action.

8. The CASB system of claim 1, wherein the controller includes a regulator that monitors the performance of all the workers and performs control based thereon.

9. A non-transitory computer-readable storage medium having computer-readable code stored thereon for programming a processor to perform steps of:
   in a Cloud Access Security Broker (CASB) system having a message broker connected to a controller, an authentication provider configured to perform authentication of one or more tenants, and a plurality of workers connected to the message broker and connected to one or more cloud providers having a plurality of files contained therein for the one or more tenants, obtaining policy and configuration for the one or more tenants provided via the controller;
   providing assignments from the message broker to the plurality of workers;
   crawling through the plurality of files for the one or more tenants, based on the policy and the configuration, to find files being one of a unique file entry or a new event, wherein a first crawl includes,
   fetching Information Technology (IT) admin change logs for file-related activities for a tenant in batches, processing the batch for unique file entries in the batch, pushing the file info into a queue, repeating until the entire IT log is crawled, and storing the log's stream-position for a next crawl, wherein IT admin change logs include statistics and transactions, and responsive to an IT admin change log not being accessible, crawling through the entire list of entities for a tenant, storing the list of entities for each tenant, storing a last change for each entity, updating tenant info, and repeating for all tenants, wherein the first crawl is synchronized with Data Leakage Prevention (DLP) scan frequency and subsequent crawls performed periodically crawl incrementally; and pushing the found files into one of a plurality of queues.

10. The non-transitory computer-readable storage medium of claim 9, wherein one of the plurality of workers is further configured to cause an action of one of the files in the plurality of queues responsive to the provided assignments.

11. The non-transitory computer-readable storage medium of claim 10, wherein the action includes any of allowing a file, deleting a file, quarantining a file, and providing a notification.

12. The non-transitory computer-readable storage medium of claim 9, further comprising the steps of
scanning the plurality of files based on the policy and the configuration for Data Leakage Prevention (DLP); and
providing an action based on the scanning.

13. The non-transitory computer-readable storage medium of claim 9, further comprising the steps of
executing a file of the plurality of files in a sandbox; and
providing an action based on the execution and based on the policy and the configuration.

14. The non-transitory computer-readable storage medium of claim 9, wherein the plurality of workers include a plurality of types of workers, each being configured to perform a specific task in the CASB system.

15. A method comprising:
in a Cloud Access Security Broker (CASB) system having a message broker connected to a controller, an authentication provider configured to perform authentication of one or more tenants, and a plurality of workers connected to the message broker and connected to one or more cloud providers having a plurality of files contained therein for the one or more tenants, obtaining policy and configuration for the one or more tenants provided via the controller;
providing assignments from the message broker to the plurality of workers;
crawling through the plurality of files for the one or more tenants, based on the policy and the configuration, to find files being one of a unique file entry or a new event, wherein a first crawl includes,
fetching Information Technology (IT) admin change logs for file-related activities for a tenant in batches, processing the batch for unique file entries in the batch, pushing the file info into a queue, repeating until the entire IT log is crawled, and storing the log's stream-position for a next crawl, wherein IT admin change logs include statistics and transactions, and
responsive to an IT admin change log not being accessible crawling through the entire list of entities for a tenant, storing the list of entities for each tenant, storing a last change for each entity, updating tenant info, and repeating for all tenants,
wherein the first crawl synchronized with Data Leakage Prevention (DLP) scan frequency and subsequent crawls performed periodically crawl incrementally; and
pushing the found files into one of a plurality of queues.

16. The method of claim 15, further comprising
scanning the plurality of files based on the policy and the configuration for Data Leakage Prevention (DLP); and
providing an action based on the scanning.

* * * * *